(12) United States Patent
Chuang

(10) Patent No.: US 7,180,844 B2
(45) Date of Patent: Feb. 20, 2007

(54) HOLOGRAPHIC DISC RECORDING SYSTEM

(75) Inventor: Ernest Chuang, Tokyo (JP)

(73) Assignee: Sony Corporation, Tokyo (JP)

( * ) Notice: Subject to any disclaimer, the term of this patent is extended or adjusted under 35 U.S.C. 154(b) by 811 days.

(21) Appl. No.: 10/359,217

(22) Filed: Feb. 6, 2003

(65) Prior Publication Data

US 2003/0161246 A1 Aug. 28, 2003

(30) Foreign Application Priority Data

Feb. 7, 2002 (JP) .............................. 2002-030673

(51) Int. Cl.
*G11B 7/00* (2006.01)
(52) U.S. Cl. ............ 369/103; 369/112.15; 369/112.05; 369/118
(58) Field of Classification Search ................ 369/103, 369/112.08, 112.28, 112.1, 112.15, 112.05, 369/118; 359/8, 28, 12
See application file for complete search history.

(56) References Cited

U.S. PATENT DOCUMENTS

| 3,843,260 | A | * | 10/1974 | Edmonds | ..................... 356/458 |
| 4,790,612 | A | * | 12/1988 | Dickson | ....................... 359/12 |
| 5,949,557 | A | * | 9/1999 | Powell | .......................... 359/8 |

* cited by examiner

*Primary Examiner*—William Korzuch
*Assistant Examiner*—Kim-Kwok Chu
(74) *Attorney, Agent, or Firm*—Oblon, Spivak, McClelland, Maier & Neustadt, P.C.

(57) ABSTRACT

A holographic disc recording system for recording, in the form of holograms, information stored on a source disc onto a target disc includes a conical beam shaper which transforms a reference beam into a conical beam having a substantially cylindrically symmetrical shape and including light rays which travel along lines which intersect a beam axis of the conical beam at substantially the same angle with respect to the beam axis. The conical beam is incident on the target disc while the beam axis of the conical beam substantially coincides with a central axis of the target disc, so that substantially all of the light rays of the conical beam are incident on the target disc at substantially the same angle.

7 Claims, 4 Drawing Sheets

HOLOGRAPHIC DISC RECORDING SYSTEM

BACKGROUND OF THE INVENTION

1. Field of the Invention

The present invention relates to holographic disc recording systems, and more specifically relates to a holographic disc recording system for recording information stored on a transmissive source disc onto a target disc composed of a holographic recording material in the form of holograms.

2. Description of the Related Art

Holographic recording techniques for recording information on a holographic storage medium in the form of holograms generally involve recording a plurality of holograms at a single recording location in the holographic storage medium by multiplexing the holograms. Holograms used for recording information are sometimes referred to as data pages. Thus, to multiplex a plurality of holograms means to multiplex a plurality of data pages. When a plurality of data pages are multiplexed, one of the characteristics of a reference beam used for recording is changed for each data page. For example, the angle at which the reference beam is incident on the storage medium or a wavelength of the reference beam is changed for each data page.

A spatial light modulator (SLM) constructed of a liquid crystal display or the like is typically used to imprint the information to be recorded on a signal beam. When a desired multiplexed hologram is to be read out, a reference beam having the same characteristic as that used for recording that hologram is used for reproducing it, and then the data page of the reproduced hologram is read with a two-dimensional detector array.

However, the above-described known holographic recording technique has several disadvantages. That is, the recording density of each data page is limited by the minimum pixel size and the minimum pixel pitch of the SLM and the two-dimensional detector array. Therefore, an extremely large number of holograms must be recorded at each of the recording locations in order to achieve high recording density. Depending on the method of multiplexing used and the amount of overlap between the adjacent recording locations in the medium, the shape of the volume occupied by a single hologram will vary, as will the effective number of holograms which can be multiplexed and recorded at a single recording location in the storage medium. Both of these factors may cause variations in reproduction intensity between the holograms recorded on the storage medium and between the pixels in each hologram. Such variations in reproduction intensity may lead to data readout errors, and complex reproduction intensity compensation techniques are required to reduce the probability of the data readout errors to a predetermined level. In addition, if the recording locations are arranged such that they do not overlap each other on the storage medium, there is a problem in that the dynamic range is reduced since the recording material between the adjacent recording locations cannot be used.

Furthermore, there is currently no feasible method for fast replication of a holographic memory obtained by using the above-described holographic recording technique. In order to copy such a holographic memory onto a target disc, a process of sequentially recording a plurality of holograms to be multiplexed must be performed at each of the recording locations in the target disc. In addition, in order to reduce the variations in reproduction intensity between the holograms multiplexed at the same recording location in the target disc, a complex exposure process must be repeated at each of the recording locations.

SUMMARY OF THE INVENTION

In view of the above-described situation, an object of the present invention is to provide a holographic disc recording system having a simple, inexpensive structure which overcomes the above-described disadvantages of the known holographic recording technique.

In addition, another object of the present invention is to provide a holographic disc recording system of the above-described type in which desired exposure characteristics can be obtained by adjusting the polarization state and the intensity distribution of a reference beam and/or a signal beam used for holographic recording with simple elements.

In addition, another object of the present invention is to provide a holographic disc recording system of the above-described type in which holograms can be multiplexed by changing the incidence angle of the reference beam with a simple, inexpensive structure.

In addition, another object of the present invention is to provide a holographic disc recording system of the above-described type which has high versatility and can perform replication of both a source disc manufactured by an amplitude-modulation recording method and a source disc manufactured by a phase-modulation recording method.

In order to attain the above-described objects, according to the present invention, a holographic disc recording system for recording, in the form of holograms, information stored on a transmissive source disc onto a target disc composed of a holographic recording material, the holographic disc recording system includes a beam-generating unit for generating a plane-wave beam of collimated coherent light; a beam splitter which splits the beam emitted by the beam-generating unit into a first beam used as a signal beam and a second beam used as a reference beam; and an optical unit which guides the first beam such that the first beam passes through the source disc and is incident on the target disc at one side thereof and guides the second beam such that the second beam is incident on the target disc at the other side thereof without passing through the source disc. The optical unit includes a conical beam shaper which transforms the second beam into a conical beam having a substantially cylindrically symmetrical shape and including light rays which travel along lines which intersect a beam axis of the conical beam at substantially the same angle with respect to the beam axis. In addition, the optical unit is constructed such that the beam axis of the conical beam substantially coincides with a central axis of the target disc when the conical beam is incident on the target disc, so that substantially all of the light rays of the conical beam are incident on the target disc at substantially the same angle.

According to the holographic disc recording system of the present invention, all optical characteristics of the reference beam incident on the target disc are uniform over the entire effective recording area of the target disc. Accordingly, the holograms can be recorded over the entire region of the effective recording area of the target disc in a one-step recording process. In addition, when the recorded holograms are reproduced, variations in reproduction intensity between the holograms and between the pixels in each hologram can be significantly reduced, so that it is not necessary to use complex reproduction intensity compensation techniques. In addition, since the reference beam is transformed into a conical beam as described above, the holograms can be read out locally by rotating the holographic disc while the angle of the reference beam used for reading out the information is set to a constant angle.

DESCRIPTION OF THE PREFERRED EMBODIMENTS

Figure 1:
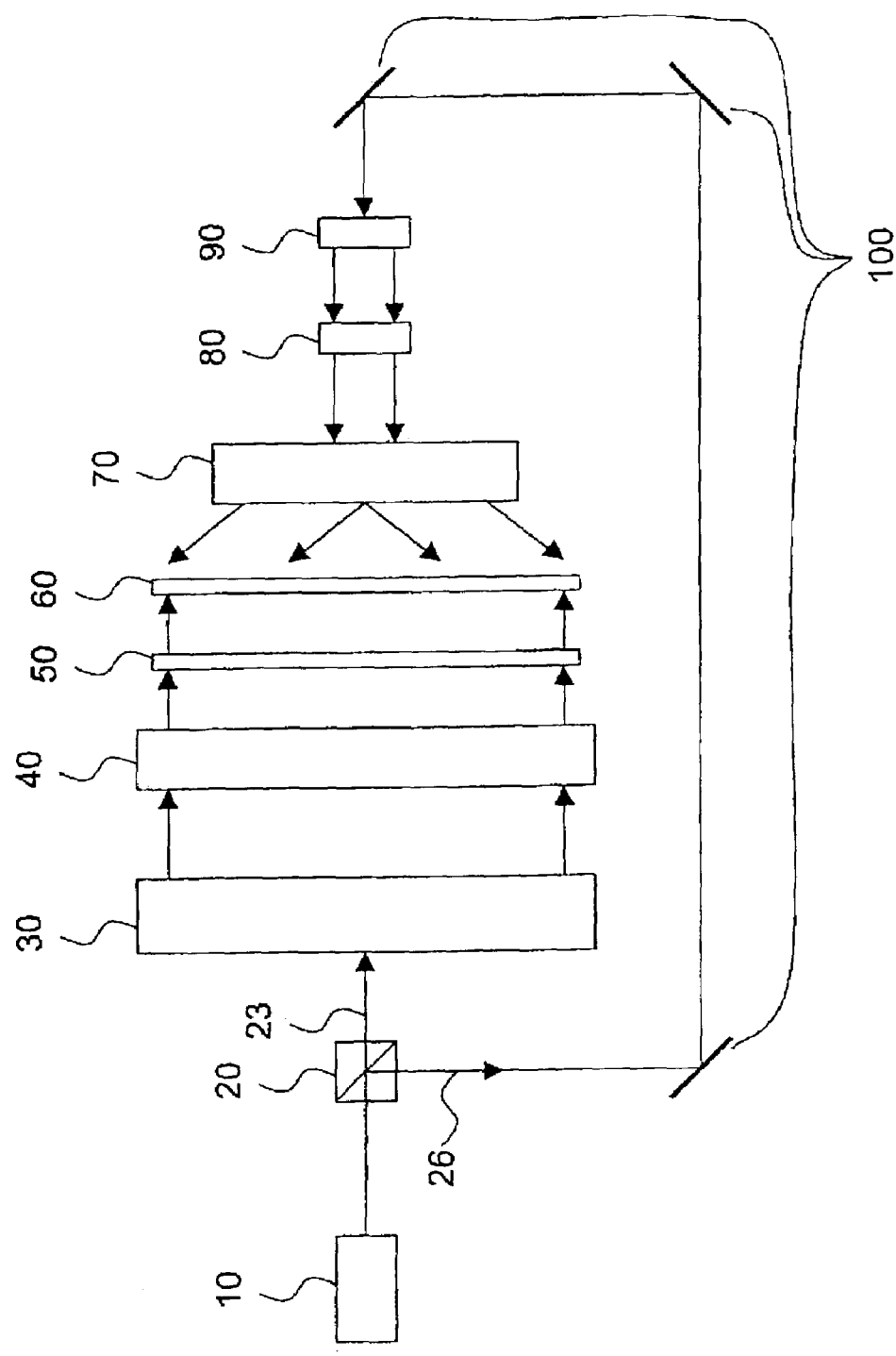
FIG. 1 is a schematic diagram showing a holographic disc recording system according to an embodiment of the present invention.

An embodiment of the present invention will be described below with reference to the accompanying drawings. FIG. 1 is a schematic diagram showing a holographic disc recording system according to the embodiment of the present embodiment. This system includes a coherent light source 10 which emits a plane-wave beam of collimated coherent light. The coherent light source 10 may be constructed of, for example, a laser device.

A beam emitted by the coherent light source 10 is split into a signal beam 23 and a reference beam 26 by a beam splitter 20. The signal beam 23 is expanded by a signal-beam expander 30 such that the diameter of the signal beam 23 is increased to a size suitable for exposure. More specifically, the diameter of the signal beam 23 is increased to a size such that the signal beam 23 covers substantially the entire effective recording area of a transmissive source disc 50, which will be described below, when it passes through the transmissive source disc 50, and is incident on substantially the entire effective recording area of a target disc 60 composed of a holographic recording material, which will be described below.

The signal beam 23 with the increased beam diameter passes through a signal-beam adjustment optical element 40. The signal-beam adjustment optical element 40 is provided when it is necessary to fine-tune the optical characteristics of the signal beam 23. A polarizer, a filter, an attenuator, etc., may be used as the signal-beam adjustment optical element 40. For example, if the signal beam 23 is to be polarized in the radial direction of the target disc 60 when it is incident on the target disc 60, a circularly symmetric polarizer may be used as the signal-beam adjustment optical element 40. In addition, if the signal beam 23 is to have a substantially uniform light intensity over substantially the entire effective recording area of the target disc 60 when it is incident on the target disc 60, a neutral density filter which is specially designed to correct the intensity distribution of a beam which passes therethrough may be used as the signal-beam adjustment optical element 40 so that the signal beam 23 is attenuated to make the light intensity distribution uniform.

After fine-tuning the optical characteristics, the signal beam 23 passes through the transmissive source disc 50. When the signal beam 23 passes through the transmissive source disc 50, the amplitude and/or the phase of the signal beam 23 is/are modulated such that information to be recorded on the target disc 60 is imprinted on the signal beam 23. Then, the modulated signal beam 23 is incident on one side of the target disc 60 composed of a holographic recording material, so that the entire effective recording area of the target disc 60 is irradiated with the signal beam 23.

The reference beam 26 is guided by an optical unit included in the holographic disc recording system and is incident on the target disc 60 at the opposite side thereof without passing through the source disc 50 such that substantially the entire effective recording area of the target disc 60 is irradiated. More specifically, the reference beam 26 is guided to the opposite side of the target disc 60 by a mirror unit 100 and is expanded by a reference-beam expander 90 such that the diameter of the reference beam 26 is increased to a size suitable for exposure. More specifically, the diameter of the reference beam 26 is increased to a size such that substantially the entire effective recording area of the target disc 60 is irradiated when the reference beam 26 is incident on the target disc 60 at the opposite side thereof.

The reference beam 26 with the increased beam diameter passes through a reference-beam adjustment optical element 80. Similarly to the case of the signal beam 23, the reference-beam adjustment optical element 80 is provided when it is necessary to fine-tune the optical characteristics of the reference beam 26, and the elements mentioned above in the description of the signal-beam adjustment optical element 40 may also be used as the reference-beam adjustment optical element 80.

After fine-tuning the optical characteristics, the reference beam 26 is incident on a conical beam shaper 70. The conical beam shaper 70 transforms the collimated reference beam 26 into a conical beam having a substantially cylindrically symmetrical shape and including light rays which travel along lines which intersect a beam axis of the conical beam at substantially the same angle with respect to the beam axis.

Figure 2:
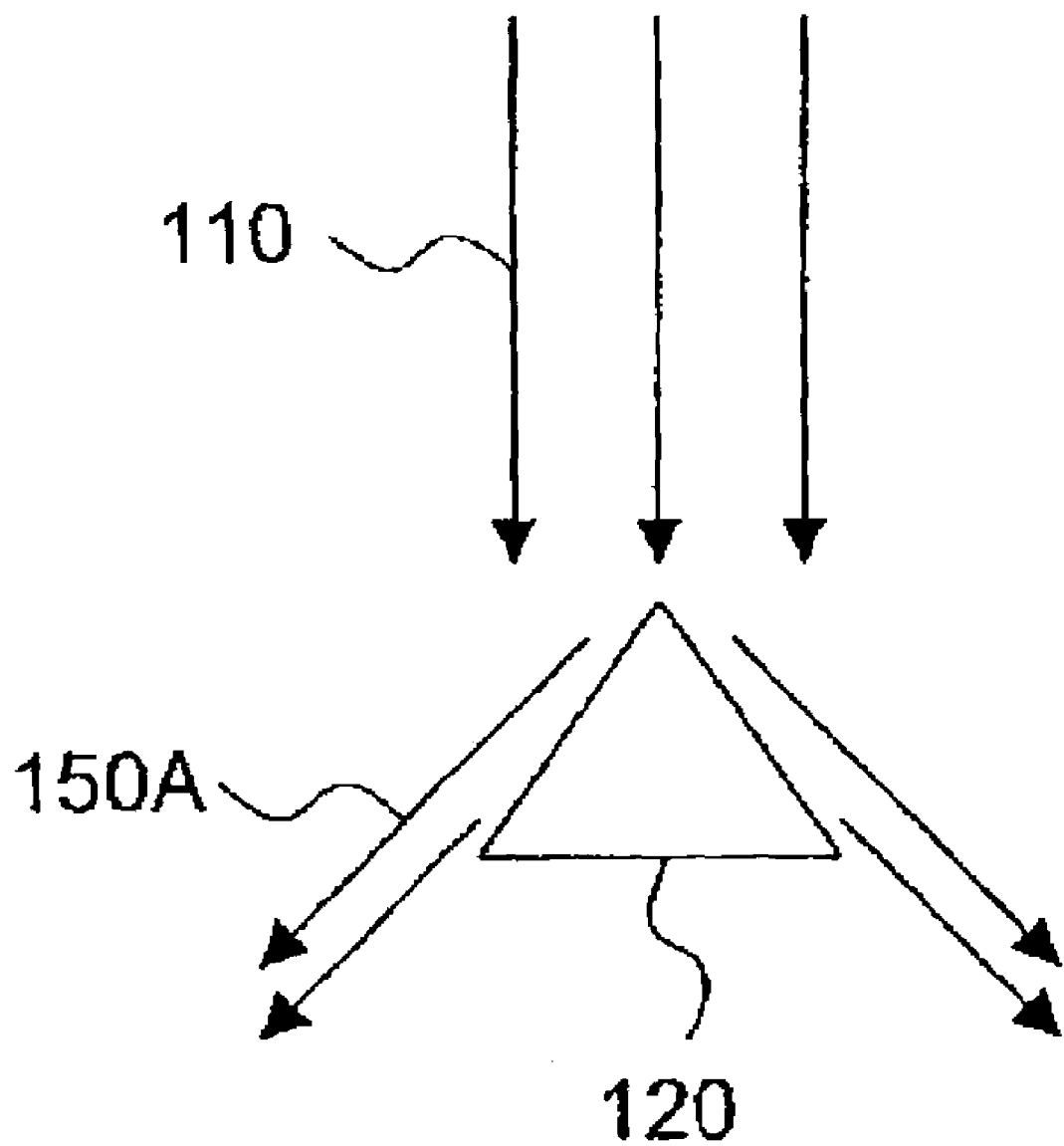
FIG. 2 is a diagram showing a conical mirror as a first example of a conical beam shaper.
Figure 3:
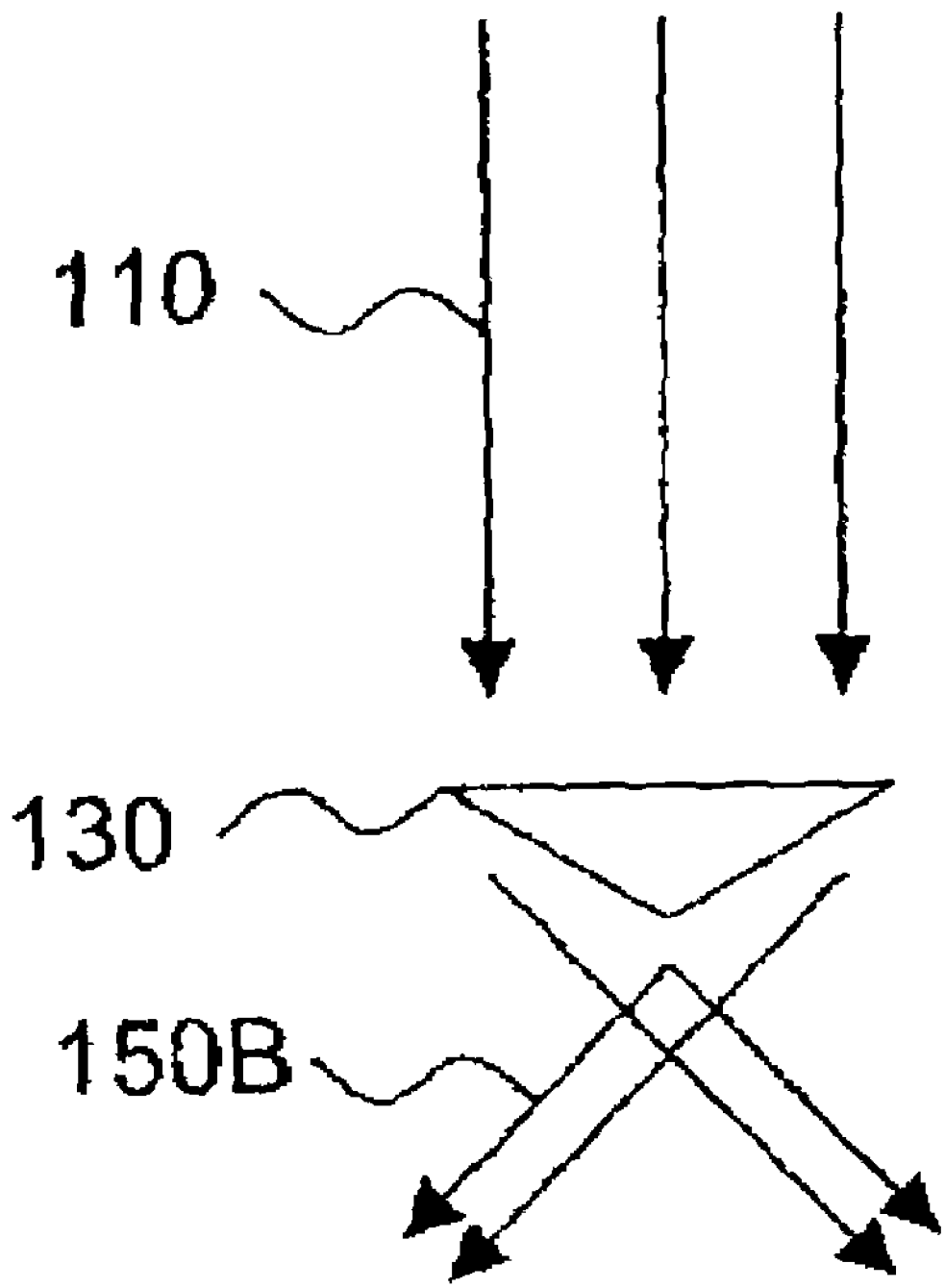
FIG. 3 is a diagram showing a conical prism as a second example of a conical beam shaper.
Figure 4:
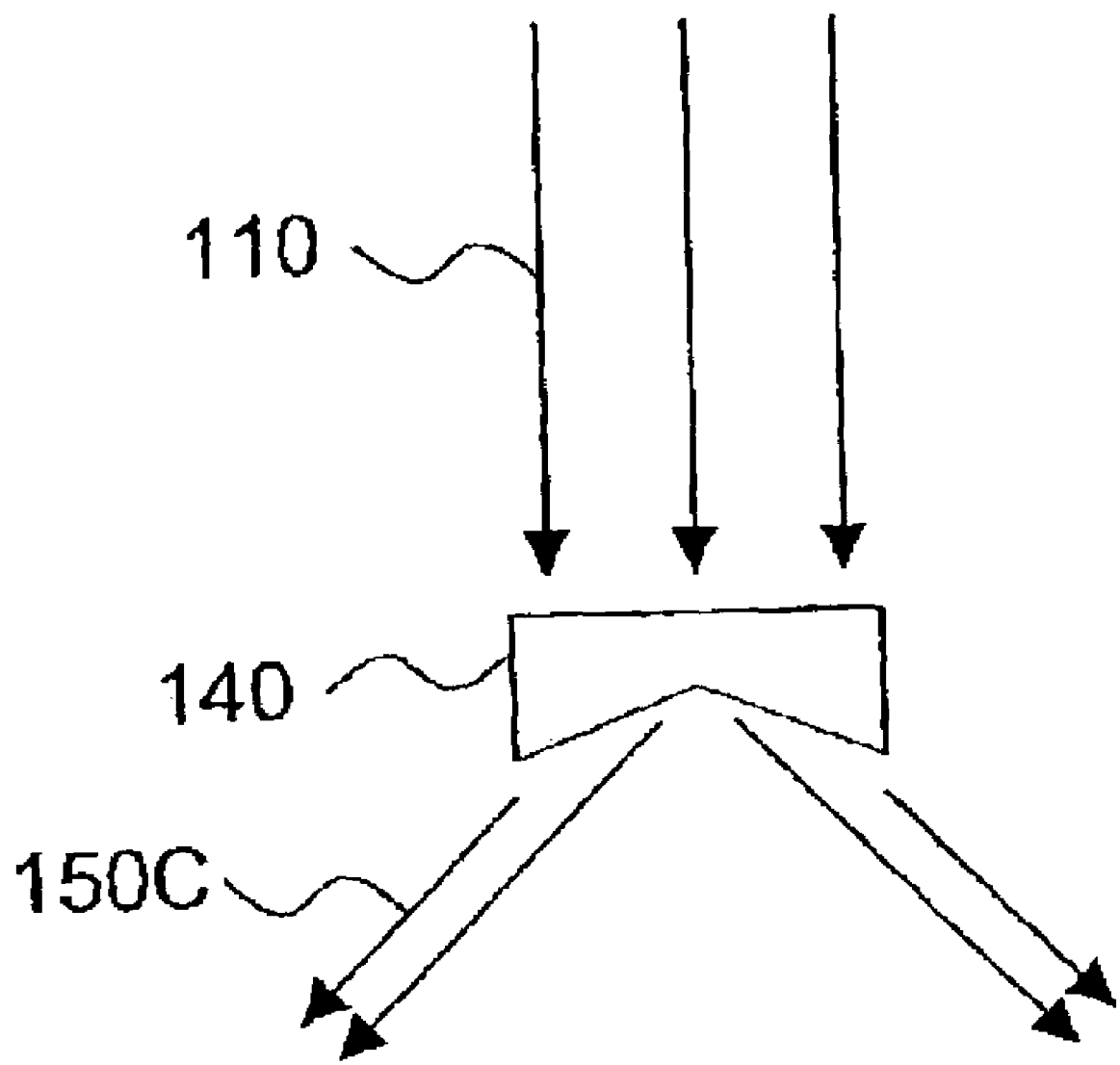
FIG. 4 is a diagram showing an inverted conical prism as a third example of a conical beam shaper.

There are various types of optical elements that can be used as the conical beam shaper 70. FIGS. 2 to 4 show examples of such optical elements. FIG. 2 shows a conical mirror 120 as a first example of a conical beam shaper. Although the three-dimensional shape of the conical mirror 120 is actually conical, it appears triangular since FIG. 2 is a side view of the conical mirror 120. When a collimated beam 110 is incident on the conical mirror 120 in a direction parallel to the central axis of the conical mirror 120, it is reflected by the surface of the conical mirror 120 such that the collimated beam 110 is transformed into an output beam 150A including light rays which travel in all radial directions of the conical mirror 120 along lines inclined at the same angle with respect to the central axis of the conical mirror 120. FIG. 3 shows a conical prism 130 as a second example, and FIG. 4 shows an inverted conical prism 140 as a third example. Similarly to the case of the conical output beam 150A emitted from the conical mirror 120, by suitably designing the prisms 130 and 140, output beams 150B and 150C having a substantially cylindrically symmetrical shape and including light rays which travel along lines which intersect the beam axes at substantially the same angle with respect to the beam axes can be emitted from the prisms 130 and 140, respectively.

The reference beam 26, which is transformed into a conical beam as described above, is incident on the target disc 60 in such a manner that the beam axis of the conical beam substantially coincides with the central axis of the target disc 60. Accordingly, substantially all of the light rays of the conical beam are incident on the target disc 60 at substantially the same angle.

Thus, according to the present invention, the reference beam used for recording the holograms is transformed into a conical beam having a substantially cylindrically symmetrical shape and including light rays which travel along lines which intersect the beam axis of the conical beam at substantially the same angle with respect to the beam axis. Then, the conical beam is incident on the target disc in such a manner that the beam axis of the conical beam substantially coincides with a central axis of the target disc, so that substantially all of the light rays of the conical beam are incident on the target disc at substantially the same angle.

According to the above-described construction, the entire effective recording area of the target disc 60 can be irradiated with the reference beam 26. In addition, all optical characteristics of the reference beam 26 are highly uniform over the entire effective recording area of the target disc 60. Furthermore, the uniformity of the optical characteristics can be improved by fine-tuning the optical characteristics of the reference beam 26, such as the polarization state, the light intensity distribution, etc., with the reference-beam adjustment optical element 80.

In addition, the holographic disc recording system having the above-described construction has high versatility and can perform the replication of both a source disc manufactured by an amplitude-modulation recording method and a source disc manufactured by a phase-modulation recording method.

Since FIG. 1 is a schematic diagram which shows the principle of the holographic disc recording system according to the present invention, the detailed structure of this system is not shown. The above-described system preferably includes a plurality of conical beam shapers 70 for emitting conical beams which are incident on the target disc 60 at different angles and a conical beam shaper selecting mechanism for selectively using one of the conical beam shapers. Accordingly, the holograms can be multiplexed by changing the incidence angle of the reference beam with a simple structure. In this case, the system may include a plurality of reference-beam adjustment optical elements 80 which are selectively used as necessary in accordance with the shape of the conical beam, which changes depending on which conical beam shaper is used.

Although FIG. 1 shows an example of the layout of elements included in the holographic disc recording system according to the present invention, the layout of the elements is not limited to this. For example, the beam expanders 30 and 90 may be disposed at any place on the optical path as long as they can change the diameters of the signal beam 23 and the reference beam 26, respectively, to a size suitable for exposure. Similarly, the signal-beam adjustment optical element 30 and the reference-beam adjustment optical element 80 may also be disposed at any place as long as they can serve their respective functions.

What is claimed is:

1. A holographic disc recording system for recording, in the form of holograms, information stored on a transmissive source disc onto a target disc composed of a holographic recording material, the holographic disc recording system comprising:

a beam generator which generates a plane-wave beam of collimated coherent light;

a beam splitter which splits the beam emitted by the beam generator into a first beam used as a signal beam and a second beam used as a reference beam;

an optical unit which guides the first beam such that the first beam passes through the source disc and is incident on the target disc at one side thereof and guides the second beam such that the second beam is incident on the target disc at the other side thereof without passing through the source disc;

a plurality of conical beam shapers for emitting conical beams which are incident on the target disc at different angles; and a conical beam shaper selecting mechanism for selectively using one of the conical beam shapers, wherein the optical unit includes the one of the conical beam shapers, and the one of the conical beam shapers transforms the second beam into a conical beam having a substantially cylindrically symmetrical shape and including light rays which travel along lines which intersect a beam axis of the conical beam at substantially the same angle with respect to the beam axis, and wherein the optical unit is constructed such that the beam axis of the conical beam incident on the target disc substantially coincides with a central axis of the target disc, so that substantially all of the light rays of the conical beam are incident on the target disc at substantially the same angle.

2. A holographic disc recording system according to claim 1, wherein the optical unit includes beam-diameter increasing means, and wherein the first beam covers the entire recording area of the source disc when the first beam passes through the source disc and is incident on substantially the entire effective recording area of the target disc, and the second beam is incident on substantially the entire effective recording area of the target disc.

3. A holographic disc recording system according to claim 1, wherein at least one of the conical beam shapers is a conical mirror.

4. A holographic disc recording system according to claim 1, wherein at least one of the conical beam shapers is a conical prism.

5. A holographic disc recording system according to claim 1, wherein at least one of the conical beam shapers is an inverted conical prism.

6. A holographic disc recording system according to claim 1, further comprising a polarizer which polarizes at least one of the first beam and the second beam such that the beam is polarized in the radial direction of the target disc when the beam is incident on the target disc.

7. A holographic disc recording system according to claim 1, further comprising an attenuator which attenuates at least one of the first beam and the second beam to make the light intensity uniform, so that the beam has substantially uniform light intensity over substantially the entire effective recording area of the target disc when the beam is incident on the target disc.

* * * * *